United States Patent
Roedl et al.

[11] Patent Number: 5,813,118
[45] Date of Patent: Sep. 29, 1998

[54] METHOD FOR REPAIRING AN AIR COOLED TURBINE ENGINE AIRFOIL

[75] Inventors: Lawrence J. Roedl, West Chester; Joseph H. Bowden, Jr., Mason, both of Ohio

[73] Assignee: General Electric Company, Cincinnati, Ohio

[21] Appl. No.: 880,669

[22] Filed: Jun. 23, 1997

[51] Int. Cl.⁶ .................................................. B23P 15/00
[52] U.S. Cl. ........................................ 29/889.1; 29/889.7
[58] Field of Search ................................. 29/889.1, 889.7, 29/402.07, 402.08, 402.03, 402.04, 402.06, 402.12, 402.13, 527.4

[56] References Cited

U.S. PATENT DOCUMENTS

| | | | |
|---|---|---|---|
| 3,544,348 | 12/1970 | Boone et al. | 117/2 |
| 4,004,047 | 1/1977 | Grisik | 427/142 |
| 4,176,433 | 12/1979 | Lee et al. | 29/156.8 |
| 4,726,104 | 2/1988 | Foster et al. | 29/156.8 |
| 4,903,888 | 2/1990 | Clark et al. | 29/889.1 |
| 4,965,095 | 10/1990 | Baldi et al. | 427/252 |
| 5,090,870 | 2/1992 | Gilliam | 29/402.04 |
| 5,142,778 | 9/1992 | Smolinski et al. | 29/889.7 |
| 5,225,246 | 7/1993 | Beers et al. | 427/282 |
| 5,441,767 | 8/1995 | DeSaulniers | 427/252 |
| 5,511,308 | 4/1996 | Ng et al. | 29/889.1 |
| 5,558,922 | 9/1996 | Gupta et al. | 29/889.1 |

*Primary Examiner*—Irene Cuda
*Attorney, Agent, or Firm*—Andrew C. Hess; David L. Narciso

[57] ABSTRACT

A method for repairing a turbine engine airfoil having an environmental resistant coating on a outer wall surface includes selecting and masking a discrete portion of the airfoil outer wall surface to protect the coating on the selected discrete portion, thereby providing a masked outer wall surface and an unmasked outer wall surface. The coating is removed from the unmasked outer wall surface, the maskant is removed, and the airfoil is repaired.

8 Claims, 1 Drawing Sheet

METHOD FOR REPAIRING AN AIR COOLED TURBINE ENGINE AIRFOIL

BACKGROUND OF THE INVENTION

This invention relates to the repair of turbine engine airfoils, and, more particularly, to the repair of air cooled airfoils including an environmental resistant coating on an outer wall and at least on a portion of internal air cooling passages adjacent external openings in the outer wall.

During operation of a turbine engine, for example a gas turbine engine, damage can occur to engine airfoils, such as blades and vanes. Such damage can result from impact of air-borne particles, thermal expansion or contraction related interference with other associated relatively moving components, contact with oxidizing or corrosive gases, thermal fatigue, or a combination of such occurrences. Because turbine engine airfoils are relatively costly to manufacture, it has been found to be more economical, when possible, to repair rather than to replace the airfoil. Examples of gas turbine engine air cooled airfoils are shown in a wide variety of publications including U.S. Pat. No. 5,387,085—Thomas, Jr., et al (patented Feb. 7, 1995); U.S. Pat. No. 5,458,461—Lee, et al. (patented Oct. 17, 1995); U.S. Pat. No. 5,503,527—Lee, et al. (patented Apr. 2, 1996); and U.S. Pat. No. 5,503,529—Anselmi, et al. (patented Apr. 2, 1996). The outer wall of such airfoils defines a hollow interior including internal cooling passages some of which terminate in openings through the outer wall through which cooling air is discharged from the hollow interior. Some airfoils include shaped discharge guides, including wall indentations and slots in various shapes, at the openings for the control of discharged air flow, in a manner well known and widely described in the art Dimensions such as wall thickness at cooling air discharge openings can be important to efficient operation and life of the airfoil.

A portion of the engine which experiences a very strenuous combination of operating conditions is in the hotter operating areas such as the turbine section. As a result, turbine section airfoils have been coated with a variety of environmental resistant coatings to extend the life of components made of costly alloys, such as the Ni base superalloys. Such coatings, which are relatively costly to apply, include the aluminide coatings, such as the commercially available Codep aluminide coating, one form of which is described in U.S. Pat. No. 3,667,985—Levine et al., patented Jun. 6, 1972. Another aluminide form of coating, currently used commercially and sometimes referred to as platinum aluminide, is a combination of a first electroplate of platinum followed by aluminiding, such as with Codep coating. Other forms of environmental resistant coatings used in the gas turbine engine art are the commercially available thermal barrier coatings (TBC), which are ceramic in nature, for example zirconia stabilized with yttria. Forms of such coatings are described in such U.S. Patent No. as U.S. Pat. No. 4,055,705—Stecura et al. (patented Oct. 25, 1977) and U.S. Pat. No. 4,095,003—Weatherly et al. (patented Jun. 13, 1978). Forms of the aluminide or generally similar metallic commercially available protective coatings have been deposited on internal wall surfaces of air cooling passages, at least where such passages open through an outer wall of the airfoil for discharge of cooling air.

During a full or extensive repair of a damaged, though salvageable, gas turbine engine airfoil, it has been the practice first to mask inner walls at such discharge openings, such as by filling discharge openings, to avoid removal of the coating within the cooling passage and then to remove the coating from the entire outer wall surface of the airfoil. It has been observed that such outer wall surface coating removal, typically by chemical stripping, has resulted in reduction in airfoil outer wall thickness. Such wall thinning can be particularly critical in thin sections as at the airfoil trailing edge, and has been a major cause for the scrapping of airfoils.

BRIEF SUMMARY OF THE INVENTION

The present invention, in one form, provides a method for repairing a turbine engine airfoil, in which method coating is retained on and not stripped from a selected discrete portion of an outer wall surface. Such airfoil includes an outer wall surface which has an environmental resistant coating thereon. To avoid removal of the coating during repair, the present invention avoids wall thinning of the airfoil wall by applying a maskant to the coating on a selected discrete portion of the outer wall surface. This provides a masked outer wall surface, and an unmasked outer wall surface. Coating is removed from the unmasked outer wall surface, the maskant is removed and the airfoil is repaired.

DETAILED DESCRIPTION OF THE INVENTION

Figure 1:
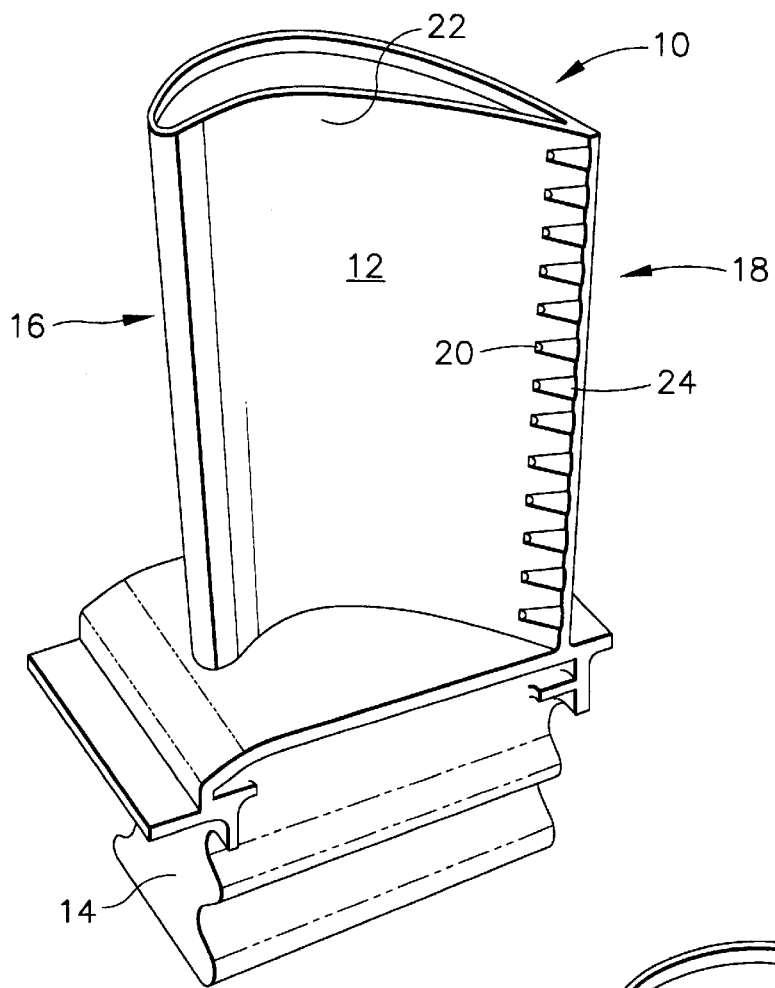
FIG. 1 is a perspective view of a gas turbine engine turbine rotor blade including trailing edge cooling air openings and associated cooling air discharge guide slots.

Modern gas turbine engine air cooled high pressure turbine blades are manufactured with relatively thin inner cavity walls and limited airfoil trailing edge thickness. In addition, at least the blade's airfoil outer walls include, on the outer wall surface, a coating or coating combination selected to provide operating environmental resistance. Frequently it is required, prior to repair of such a blade, to remove the coating on the airfoil for selected repair, for example for the weld repair of cracked or eroded airfoil material or the replacement of selected airfoil wall portions.

It has been the practice first to mask inner walls defining the internal cavities up to the discharge openings to prevent removal of coating on such inner walls, and then to remove the entire coating on the airfoil outer wall surface. Inner cavity wall masking generally is accomplished by flowing or injecting into the blade hollow interior, for example through an opening in the blade base, a maskant which later can be removed substantially without residue, such as by heating at a relatively low temperature to decompose the maskant. Typical materials used for such maskants include waxes and acid resistant curable or hardenable resins, one example of which are the vinyls. This maskant fills the internal cavities up to the openings at which airfoil internal passages exit the airfoil outer wall. Any excess maskant flowing onto the outer surface of the coated outer wall is removed such as by grit blasting to uncover the coated outer surface. Such grit blasting also is used to remove from the coating surface any surface contamination, such as corrosion or oxidation, thereby exposing a clean coating surface. Then, according to current practice, the coating is removed from the entire airfoil outer wall surface, generally by commercial acid stripping materials, for example aqueous solutions based on nitric acid or a combination of nitric and phosphoric acids, followed by hydrochloric acid solution. In this way, the blade airfoil was prepared for selected repair.

It has been observed that, as a result of the above described current airfoil repair pretreatment coating stripping method, material was removed from the outer wall of the airfoil, resulting in thinning of the wall, including at the airfoil trailing edge. Frequently, such wall thickness reduction at the trailing edge was in excess of allowable limits, thereby requiring scrapping of the blade. As was stated, such reduction in trailing edge thickness has been observed to be one of the greatest causes for blade scrap. In one typical example involving prior repair practice, an air cooled high pressure turbine blade, which had been operated in a gas turbine engine, was prepared for airfoil repair. The blade had been cast from a Ni base superalloy sometimes referred to as monocrystalline Rene' N5 alloy, forms of which are described in U.S. Pat. No. 5,173,255—Ross et al., patented Dec. 22, 1992. The wall thickness at the trailing edge portion of the blade was designed to be no less than about 0.017". Preparation included removing an outer aluminide environmental protective coating from the entire airfoil outer wall surface, including wall surfaces adjacent air cooling openings through the blade outer wall at the trailing edge portion of the blade. Such removal was accomplished by subjecting the coating to an aqueous solution of a commercial stripping mixture of nitric and phosphoric acids for about 2 hours at a temperature of about 160° F. Then the blade was rinsed in water and immersed in an aqueous solution of about 25% hydrochloric acid at about 160° F. for about 15 minutes. This was adequate to remove the coating from the entire outer wall surface. However, inspection after coating removal revealed that exposure to the acid stripping materials to the extent necessary to remove the coating had resulted in wall thickness reduction or thinning in the trailing edge portion of the blade at the cooling hole openings by about 0.008". Such thinning resulted in a wall thickness below the minimum allowable operating thickness and the blade had to be scrapped.

The present invention provides an airfoil repair method which avoids structural material removal or wall thickness reduction on a selected portion of an outer wall surface, particularly in such critical portions as the airfoil trailing edge or other portions of the airfoil designed to include relatively thin outer walls over the airfoil hollow interior. The airfoil trailing edge is used herein as an example of such critical airfoil portion.

With reference to the drawing, a perspective view of an air cooled gas turbine engine turbine rotor blade is shown in FIG. 1. In that figure, the blade shown generally at 10 includes an airfoil 12 and a base 14. The airfoil leading edge is shown generally at 16 and the airfoil trailing edge is shown generally at 18. Cooling air discharge openings, such as holes 20 in a portion of trailing edge 18, communicate with the blade hollow interior to enable cooling air discharge from the blade interior and cooling of the blade outer wall 22, the discharge air being guided by air cooling slots or indentations 24 in outer wall 22. For high temperature environmental resistance during operation, outer wall 22 and generally at least the walls of openings 20 include a coating such as a commercially available aluminide coating. An example of such a coating is the above identified Codep aluminide coating. In some examples, a platinum aluminide combination coating is used, the platinum being first applied by electrodeposition, followed by Codep aluminide treatment of the platinum surface.

Air cooled turbine blades of this general structural type are shown in the above mentioned U.S. Pat. No. 5,503,527—Lee et al. and U.S. Pat. No. 5,503,529—Anselmi et al. Those blades include an outer wall defining a blade hollow interior having inner walls and from which cooling air is discharged through openings in the trailing edge portion. Cooling air discharge from the openings is guided by a series of trailing edge slots, for example as shown in FIG. 1 of each of those patents. High pressure turbine blades of this type are manufactured with relatively thin internal cavity walls and thin trailing edge wall thickness.

As was mentioned above, operation of such high pressure turbine blades in a gas turbine engine can result in various types of wear, erosion, corrosion or other damage or distress, particularly to the airfoil portion, which requires some type of repair prior to being returned to service. Often, such repair is not required in the structural wall of a critical portion of the blade, for example the trailing edge portion which includes very thin walls and the above described cooling air discharge holes, slots, etc. Therefore, it was recognized under such circumstances, according to the method of the present invention, that to maintain critical wall thickness, the environmental resistant coating on such a selected discrete portion of the blade can be retained by selective, partial masking rather than be removed as in current methods. The present invention provides a repair method including partial rather than entire removal of coating from an air cooled blade outer wall surface, retaining coating on a discrete selected portion, for example which includes such openings.

Figure 2:
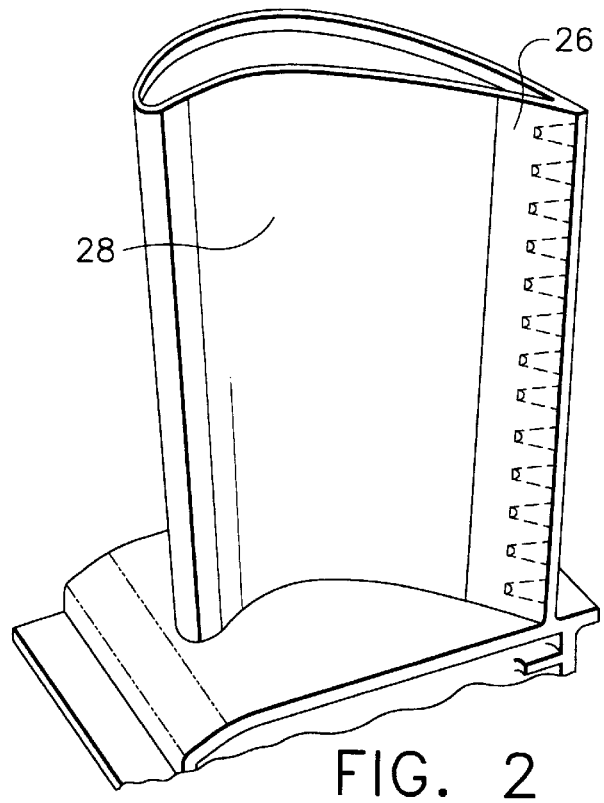
FIG. 2 is a fragmentary view of FIG. 1 with outer wall maskant on the trailing edge outer wall surface over cooling air openings and discharge guide slots.

One form of steps in the practice of the present invention is shown in FIG. 2 which is a fragmentary view of the blade of FIG. 1. The blade airfoil in FIG. 2 required repair in areas not including the trailing edge portion. In FIG. 2, a maskant was applied to the surface of the coating on outer wall 22 in the selected discrete trailing edge portion shown to provide a masked coated outer wall surface 26 and an unmasked coated outer wall surface 28. Then, to prepare the airfoil further for repair, coating was removed only from the unmasked surface 28. The coated surface beneath masked surface 26 thereby was preserved, without risk of wall thinning resulting from coating removal. After such selected coating removal, the maskant was removed and the airfoil was repaired. Generally, a replacement environmental resistant coating, which can be the same as or different from other coatings on or within the blade, is applied at least to the stripped, unmasked surface 28.

In one specific example of the practice of the present invention, an air cooled high pressure turbine blade from operation in a gas turbine engine was inspected for damage and serviceability. The blade was of the type described in connection with FIG. 1 and included trailing edge air cooling discharge openings and guide slots as shown. It was determined that a portion of the airfoil away from the trailing edge was damaged but could be repaired and made serviceable by welding. The blade had been cast from the above identified monocrystalline Rene' N5 Ni base superalloy. For environmental resistance during operation, the blade airfoil had been coated with the above described platinum aluminide combination coating. Included on inner walls of internal passages connected with the air cooling discharge openings was a coating of aluminide which had been deposited, as well known in the art, by a commercially available gas phase type of aluminiding.

In this example, the blade was prepared for repair by aluminum oxide grit blasting the airfoil, except for the trailing edge portion which included the cooling air discharge openings and slots, sufficiently to remove surface contaminants, such as products of combustion, corrosion, oxidation, etc. Then a combination of blade masking was applied: to the selected discrete trailing edge portion over the openings and slots, as shown at 26 in FIG. 2; and within internal cavities to cover inner walls at least up to the openings in the outer wall. Masking of the internal cavities, as currently practiced in the art, was accomplished by injecting a commercial acid resistant resin maskant, sometimes called Plastisol material, into an opening through the blade base until the maskant was extruded through the air cooling discharge openings, thereby masking inner coated walls. In addition, according to the present invention, additional maskant was applied to the airfoil outer wall, limited to the selected trailing edge portion, by dipping that portion in Plastisol material. Any maskant which inadvertently was deposited, from the masking steps, on the outer wall other than on the selected outer wall surface in the trailing edge portion and within the air discharge openings, was removed by a light aluminum oxide grit blast. If desired, the removal of surface contaminants from engine operation and removal of undesired maskant on the outer wall surface can be combined in a single grit blast operation.

This provided the airfoil with a masked outer wall surface 26 and an unmasked outer wall surface 28. That maskant is typical of a variety of commercially available wax or curable resin maskants which are resistant to commercial acid based coating stripping solutions, for example the combination of acid solutions described above, and which can be removed substantially without residue by heating at a relatively low temperature, for example in the range of up to about 1100° F.

In order to remove the aluminide coating from the unmasked outer wall surface, the blade first was immersed for about 2 hours in a commercial aqueous acid stripping solution of a combination of nitric and phosphoric acids, commonly used in the art, at a temperature of about 160° F. After rinsing in water, the blade was immersed for about 15 minutes in an aqueous solution of about 25% hydrochloric acid at about 160° F. Because the selected trailing edge portion was protected from contact with the stripping solutions, such portion remained intact and unaffected by the material removal solution: the outer wall and coating beneath the selected masked portion was not diminished and no wall thinning occurred.

After such partial coating removal from the airfoil, the maskants were removed by heating in a furnace for about 3 hours in air at about 1100° F. Inspection thereafter revealed that the maskant had been removed substantially without residue. The blade airfoil now was in a proper condition for repair, and was repaired by welding.

In order to provide the repaired airfoil with protection for operation, an additional, replacement environmental resistant coating was applied at least to the uncoated airfoil outer wall. As was mentioned above, one type of aluminide coating used commercially for environmental protection is the platinum aluminide (Pt-Al) coating in which platinum is first electrodeposited on a surface and then the platinum is aluminided. In this specific example according to the present invention, a Pt-Al coating was retained on the selected portion of the outer wall at the trailing edge portion. Application of the replacement coating at least to the stripped outer wall surface after repair included remasking the selected outer wall surface on which the Pt-Al coating had been retained by applying a maskant commonly used in electroplating, such as plater's wax, acrylic lacquer, etc. Then the uncoated outer wall portion was electroplated with platinum. The maskant was removed and the outer wall surface was aluminided using the above described Codep aluminide coating method.

In another example in which the retained, protected coating on the selected outer wall of the airfoil was the above identified Codep aluminide coating without the platinum in combination, the additional, replacement coating was Codep aluminide. This coating was applied by the pack sementation process directly over the entire outer wall surface, including the outer wall surface from which the coating had been stripped as well as the previously masked outer wall surface from which coating had not been stripped.

Inspection of the repaired, recoated blades in each example revealed no wall thinning in the selected portion of the blade as a result of coating stripping necessary for the repair steps. In the above examples, the trailing edge portion was used as the selected portion. However, the present invention can be applied to other portions of the airfoil outer wall at which wall thinning can be detrimental to the life of a blade.

The present invention has been described in connection with specific examples and embodiments which are intended to be typical of rather than in any way limiting on the scope of the present invention. Those skilled in the arts associated with this invention will understand that it is capable of variations and modifications without departing from the scope of the appended claims.

We claim:

1. In a method for repairing a turbine engine airfoil including an outer wall surface having thereon an environmental resistant coating, the steps of:

selecting a discrete portion of the outer wall surface to be masked;

applying an outer wall maskant to the coating on the selected discrete portion to cover the coating on the selected portion, the maskant being sufficient to avoid removal of the coating on the selected portion during a subsequent coating removal processing, thereby providing a masked outer wall surface and an unmasked outer wall surface;

removing the coating from the unmasked outer wall surface;

removing the maskant from the outer wall surface; and then, repairing the airfoil.

2. The method of claim 1 in which a replacement environmental resistant coating is applied to the unmasked outer wall surface after repairing the airfoil.

3. In the method of claim 1 for repairing an air cooled turbine engine airfoil including a leading edge portion, a trailing edge portion, an outer wall including an outer wall surface and defining a hollow airfoil interior, and inner walls including inner wall surfaces defining within the hollow interior air cooling passages which terminate at the outer wall to define air cooling openings through the outer wall for discharge of cooling air from the hollow interior, the outer wall surface and at least a portion of the inner wall surfaces at the openings having environmental resistant coating thereon, and in which method at least the inner wall surfaces at the openings have been masked to avoid removal of coating on the inner wall surfaces up to the openings during repair, the steps of:

selecting a discrete portion of the outer wall surface to be masked;

applying an outer wall maskant to the coating on the selected discrete portion to cover the coating on the selected portion, the maskant being sufficient to avoid removal of the coating on the selected portion during a subsequent coating removal processing, thereby providing a masked outer wall surface and an unmasked outer wall surface;

removing the coating from the unmasked outer wall surface;

removing all maskant from the airfoil; and then, repairing the airfoil.

4. The method of claim 3 in which a replacement environmental resistant coating is applied to the unmasked outer wall surface after repairing the airfoil.

5. The method of claim 3 in which the discrete selected portion of the outer wall is adjacent the air cooling openings.

6. The method of claim 5 in which the selected portion is at the trailing edge portion of the airfoil.

7. The method of claim 6 in which the trailing edge portion includes trailing edge air cooling openings and trailing edge outer wall air discharge guides for the trailing edge air cooling openings.

8. The method of claim 4 in which:

the environmental resistant coating is a platinum aluminide; and, the replacement environmental resistant coating is applied, after repair, by:

(a) applying a maskant to remask the selected discrete portion;

(b) depositing platinum on the unmasked outer wall surface;

(c) removing the maskant; and then, (d) aluminiding the outer wall surface.

\* \* \* \* \*